(12) United States Patent
Adachi et al.

(10) Patent No.: US 7,005,156 B2
(45) Date of Patent: Feb. 28, 2006

(54) PROCESS FOR PRODUCING TOFU

(75) Inventors: Tomohiko Adachi, Kobe (JP); Shin Nakatani, Kobe (JP); Takeshi Akasaka, Kobe (JP); Makoto Sakamoto, Izumisano (JP)

(73) Assignee: Fuji Oil Company, Limited, Osaka (JP)

( * ) Notice: Subject to any disclaimer, the term of this patent is extended or adjusted under 35 U.S.C. 154(b) by 197 days.

(21) Appl. No.: 10/333,454

(22) PCT Filed: Aug. 31, 2001

(86) PCT No.: PCT/JP01/07584

§ 371 (c)(1),
(2), (4) Date: Jan. 22, 2003

(87) PCT Pub. No.: WO02/17733

PCT Pub. Date: Mar. 7, 2002

(65) Prior Publication Data

US 2003/0134031 A1 Jul. 17, 2003

(30) Foreign Application Priority Data

Sep. 1, 2000 (JP) .............................. 2000-264738

(51) Int. Cl.
*A23L 1/20* (2006.01)

(52) U.S. Cl. ...................... 426/634; 426/100; 426/101; 426/442; 426/573

(58) Field of Classification Search ................ 426/634, 426/100, 101, 442, 573
See application file for complete search history.

(56) References Cited

U.S. PATENT DOCUMENTS

| 4,678,677 A | * | 7/1987 | Sugisawa et al. ............ 426/634 |
| 5,950,525 A | * | 9/1999 | Iwamoto ....................... 99/452 |
| 6,342,256 B1 | * | 1/2002 | Oomura et al. ................ 426/46 |

FOREIGN PATENT DOCUMENTS

JP        11098970        *   4/1999

* cited by examiner

*Primary Examiner*—Anthony Weier
(74) *Attorney, Agent, or Firm*—Wenderoth, Lind & Ponack, L.L.P.

(57) ABSTRACT

There is provided a process for producing tofu wherein a delayed action coagulant is dispersed in heated soybean milk in a static inline mixer provided with a narrowed part and then a thickening raw material is added thereto in an inline mixer provided with a dividing element to thereby continuously and efficiently produced a nigari-tofu product being in a good state and having favorable taste.

4 Claims, No Drawings

PROCESS FOR PRODUCING TOFU

FIELD OF THE INVENTION

The present invention provides a process for continuously producing tofu (bean curd) by using a so-called nigari-type coagulant.

BACKGROUND OF THE INVENTION

In a traditional most popular process for producing tofu, tofu is produced by adding a nigari-type coagulant to soybean milk and filling the resultant mixture into a frame. In addition to conventional nigari (bittern) extracted from sea water, alkaline earth metal chlorides such as calcium chloride, magnesium chloride and the like can be used as a nigari-type coagulant, and the resultant nigari-tofu product is excellent in flavor, taste and texture in comparison with a tofu product produced by using a sulfate-type coagulant whose main component is alkaline earth metal sulfates. However, since a nigari-type coagulant has higher water-solubility and higher reactivity, there are many restrictions for using it. Then, in some cases, a delayed action coagulant prepared by covering nigari with a hydrogenated oil or an oil phase has been used.

On the other hand, for producing frozen tofu, starches, saccharides, gelatin, thickening polysaccharides, etc. are used to prevent freezing denaturation. However, when they are added to soybean milk, in many cases, soybean milk is thickened and a coagulant is hardly dispersed therein at a temperature at which the coagulant is allowed to react. Then, the addition of a coagulant is conducted after once cooling soybean milk to which a thickening raw material such as starch or the like has been added. However, there is such a problem that, when the temperature is raised again to cause coagulation, it is difficult to make best use of the original effects of nigari on flavor and tissue, and workability is also insufficient.

DISCLOSURE OF THE INVENTION

An object of the present invention is to provide a process for producing a nigari-tofu product continuously and efficiently.

The present invention relates to a process for producing tofu which comprises dispersing a delayed action coagulant in heated soybean milk, followed by addition of a thickening raw material thereto; the process for producing tofu, wherein the delayed action coagulant is alkaline earth metal chloride(s) coated with fat, or a water-in-oil type emulsion whose inner phase is an aqueous dispersion of alkaline earth metal chloride(s); and the process for producing tofu, wherein the addition of the coagulant is conducted in a static inline mixer provided with a narrowed part and the addition of the thickening raw material is conducted in an inline mixer provided with a dividing element. Further, the present invention relates to tofu produced by these processes.

Hereinafter, the present invention will be illustrated in detail.

Soybean milk used in the present invention is not limited to a specific one and there can be used soybean milk prepared from soybeans by a known method, for example, "boiling water grind" method or "cold grind" method. Soybean milk prepared by "boiling water grind" method can be used as such, or can be used after somewhat cooling (60 to 80° C.). On the other hand, soybean milk prepared by "cold grind" method is heated (90 to 100° C.) to prepare heated soybean milk and it can be used as such, or can be used after somewhat cooling (60 to 80° C.).

Any conventional technique except that described hereinafter is applicable to the process of producing tofu of the present invention.

The delayed action coagulant is alkaline earth metal chloride(s) coated with fat, a water-in-oil type (W/O) emulsion whose inner phase is an aqueous dispersion of alkaline earth metal chloride(s), or alkaline earth metal chloride(s) coated with an emulsifier, and is a coagulant whose reactivity with soybean milk is controlled by chemical means.

Examples of alkaline earth metal chlorides include magnesium chloride, calcium chloride and the like.

The thickening raw material is an additive which increases viscosity at a temperature higher than room temperature (about 50 to 90° C.) and examples thereof include starches, gelatin, thickening polysaccharides and the like.

The degree of mixing will be illustrated hereinafter. "Strong mixing" means a mixing method which causes significant turbulence. Specifically, it means a mixing method with an apparatus driven by power such as homogenizer, homomixer, etc. When heated soybean milk and the delayed action coagulant are subjected to "strong mixing", soybean milk and a nigari-type coagulant react at once. "Medium mixing" and "weak mixing" mean mixing methods wherein mixing is conducted in a static inline mixer. Among them, "medium mixing" is a mixing method conducted in a static inline mixer provided with a narrowed part. Specifically, disperser, dispersing-type mixer ("Bunsan-kun" manufactured by K. K. Fujikin), etc. can be used. On the other hand, "weak mixing" is a mixing method conducted in an inline mixer provided with an dividing element. For example, a static mixer, etc. can be used. When heated soybean milk and the delayed action coagulant are subjected to "weak mixing", the coagulant cannot be dispersed uniformly and forms large undispersed lumps. However, starch can be uniformly dispersed and mixed. This difference in the mixing state is considered to be largely due to physical properties of a particular material, especially, viscosity. That is, the difference is considered to be resulted from the fact that the delayed action coagulant has higher viscosity, while starch has low viscosity.

Hereinafter, the process for producing tofu of the present invention will be illustrated.

The formulation of tofu used in the process of the present invention is, for example, soybean milk to which one or more additives selected from, for example, starches, saccharides, gelatin, thickening polysaccharides and transglutaminase, and the delay action coagulant are added.

The present invention is based on the finding that no problem is caused by firstly dispersing and mixing the delayed action coagulant in heated soybean milk uniformly and then dispersing starch, etc. lightly therein. If starch is also subjected to strong mixing at the same time of mixing of the delayed action coagulant, physical gelatinization of starch is quickly caused due to strong mixing and stirring, which results in tremendous increase in viscosity. Then, formation of a uniform tofu gel is hardly expected.

BEST MODE FOR CARRYING OUT THE INVENTION

Hereinafter, the following Examples further illustrate the present invention but are not to be construed to limit the scope thereof.

EXAMPLE 1

To whole soybeans (5 kg) was added water (15 kg) at 10° C. and soaked in water for 14 hours. This was separated into soaked whey and soaked soybeans with a 10 mesh sieve. The soaked soybeans together with grinding water (25 kg) were ground by using a grinder (manufactured by Nakagawa Seisaku-sho) to obtain soybean puree. This was separated into soybean milk (solids content: 9% by weight) and "okara (soy pulp)" by using a separator (manufactured by Tofer). The soybean milk was subjected to heat treatment at 98° C. for 5 minutes by using an indirect heating apparatus (manufactured by Hoshitaka). The resultant soybean milk was heat-concentrated under reduced pressure (100 torr) with a concentrator (manufactured by Nichihan Seisaku-sho) to adjust the solids content to 12.5% by weight.

The soybean milk was adjusted to 70° C. The delayed action coagulant, "Nigari Meijin" (manufactured by Riken Vitamin), was continuously added to the soybean milk in a ratio of 0.5 part (by weight, hereinafter all parts are by weight) per 100 parts of soybean milk, with medium mixing ("Bunsan-kun" manufactured by Fujikin). Then, starch, "Delica E-7" (manufactured by Nichiden Kagaku), (2 part) dispersed in water was injected therein and the mixture was subjected to weak mixing (static mixer manufactured by Noritake). The resultant mixture was continuously applied on a continuous steam cooking steel belt and heated at 90° C. for about 30 minutes to produce tofu. This was cut into 15 mm cubes and frozen with a freezer (manufactured by Daiwa Reiki Kogyo).

Comparative Example 1

According to the same manner as that in the above Example, tofu was produced except that "Nigari Meijin" and starch were added at the same time and subjected to strong mixing.

Comparative Example 2

According to the same manner as that in the above Example, tofu was produced except that "Nigari Meijin" and starch were added at the same time and subjected to weak mixing.

Comparative Example 3

According to the same manner as that in the above Example, tofu was produced except that "Nigari Meijin" was continuously added to the resultant soybean milk with weak mixing, starch, "Delica E-7", (2%) dispersed in water was added thereto, followed by medium mixing to continuously produced a mixture which was applied to the belt.

The results of evaluation of Example 1 and Comparative Examples 1 to 3 are shown in Table 1.

TABLE 1

| Items evaluated | Example 1 | Comp. Example 1 | Comp. Example 2 | Comp. Example 3 |
|---|---|---|---|---|
| State of coagulation | 5 | 2 | 1 (no gelation) | 2 |
| State of tofu | 5 | 2 | 1 (no formation of tofu) | 2 |

The evaluation was conducted by 5 panelists. The score 4 or higher represents "good".

The product of Example 1 had a good state of tofu and a good taste in addition to a good state of coagulation. On the other hand, both states of coagulation and tofu of all the products of Comparative Examples 1 to 3 were undesirable.

EXAMPLE 2

According to the same manner as that in Example 1, tofu was produced except that "Cho Nigari" (Riken Vitamin) (0.4 part) which is a delayed action coagulant prepared by coating alkaline earth metal chloride(s) with an emulsifier was injected instead of "Nigari Meijin".

EXAMPLE 3

According to the same manner as that in Example 1, tofu was produced except that the delayed action coagulant obtained in Example 1 of JP 2000-032941 A (0.8 part) was injected instead of "Nigari Meijin".

Both products of Examples 2 and 3 had a good state of tofu and a good taste in addition to a good state of coagulation.

INDUSTRIAL APPLICABILITY

As described hereinabove, according to the present invention, a nigari-tofu product having a good state of tofu and a good taste can be produced continuously and efficiently.

What is claimed is:

1. A continuous process for producing frozen tofu which comprises dispersing a delayed action coagulant which is alkaline earth metal chloride(s) coated with fat, a water-in-oil type emulsion whose inner phase is an aqueous dispersion of alkaline earth metal chloride(s), or alkaline earth metal chloride(s) coated with an emulsifier, in heated soybean milk, followed by addition of a thickening raw material thereto.

2. The process for producing tofu according to claim 1, wherein the thickening raw material is starch, gelatin or thickening polysaccharides.

3. The process for producing tofu according to claim 1, wherein the addition of the coagulant and the thickening raw material are conducted in a static inline mixer.

4. The process for producing tofu according to claim 1, wherein the addition of the coagulant is conducted in a static inline mixer provided with a narrowed part and the addition of the thickening raw material is conducted in an inline mixer provided with a dividing element.

* * * * *